United States Patent [19]
Baier et al.

[11] Patent Number: 5,793,814
[45] Date of Patent: Aug. 11, 1998

[54] TRANSMISSION METHOD FOR SIMULTANEOUS SYNCHRONOUS OR ASYNCHRONOUS TRANSMISSION OF K DATA SEQUENCES CONSISTING OF DATA SYMBOLS

[75] Inventors: Paul-Walter Baier, Kaiserslautern; Anja Klein, Niderkirchen; Martin Werner, Fulda, all of Germany

[73] Assignee: Siemens Aktiengesellschaft, Munich, Germany

[21] Appl. No.: 607,562

[22] Filed: Feb. 27, 1996

[30] Foreign Application Priority Data

Mar. 17, 1995 [DE] Germany ............ 195 09 867.6

[51] Int. Cl.$^6$ ............ H04B 1/12; H04B 1/69; H04B 15/00; H04J 13/00
[52] U.S. Cl. ............ 375/285; 375/200; 375/349; 370/441
[58] Field of Search ............ 375/200, 201, 375/202, 206, 260, 349, 285; 370/335, 342, 441, 479, 203, 208, 209

[56] References Cited

U.S. PATENT DOCUMENTS

| | | | |
|---|---|---|---|
| 3,609,682 | 9/1971 | Mitchell | 371/37.9 |
| 4,601,046 | 7/1986 | Halpern et al. | 375/260 |
| 4,821,289 | 4/1989 | Peile | 375/232 |
| 4,989,262 | 1/1991 | Saito | 455/138 |
| 5,119,400 | 6/1992 | Koch | 375/230 |
| 5,136,612 | 8/1992 | Bi | 370/342 |
| 5,202,903 | 4/1993 | Okanoue | 375/347 |
| 5,230,003 | 7/1993 | Dent et al. | 371/43 |
| 5,295,159 | 3/1994 | Kerpez | 375/260 |
| 5,313,457 | 5/1994 | Hostetter et al. | 370/320 |
| 5,394,434 | 2/1995 | Kawabe et al. | 370/342 |
| 5,463,660 | 10/1995 | Fukasawa et al. | 370/342 |
| 5,533,012 | 7/1996 | Fukasawa et al. | 370/342 |
| 5,568,519 | 10/1996 | Baier et al. | 375/343 |

FOREIGN PATENT DOCUMENTS

| | | |
|---|---|---|
| 0 392 603 A2 | 10/1990 | European Pat. Off. . |
| 0 430 413 B1 | 6/1991 | European Pat. Off. . |
| 0 642 243 A1 | 8/1995 | European Pat. Off. . |
| 41 21 356 A1 | 1/1993 | Germany . |
| 43 11 604 C1 | 7/1994 | Germany . |

OTHER PUBLICATIONS

Verdu, S., Minimum Probability of Error for Asynchronous Gaussian Multiple–Access Channels, IEEE Trans. IT 32 (1986, 85–96).

Proakis, J.G., Digital Communications, New York, McGraw–Hill, 1989.

Communications–Technology that Unites Nations,Conference Record vol. 1/3, Geneva, 1993, pp. 23–26. Communications, IEEE.

Dent, P.; Gudmundson, B. Ewerbring, M.,CDMA–IC: A Novel Code Division Multiple Access Scheme Based On Interference Cancellation, Proc. Symp. Boston, 1992, 98–102.

Duel–Hallen, A., "Decorrelating Decision–Feedback Multiuser Detector for Synchronous Code–Division Multiple––Access Channel," IEEE Trans. on Communications, vol. 1, No. 2, pp. 285–290, Feb. 1993.

Primary Examiner—Stephen Chin
Assistant Examiner—Jeffrey W. Gluck
Attorney, Agent, or Firm—Hill & Simpson

[57] ABSTRACT

In a transmission method for simultaneous synchronous or asynchronous transmission of K data sequences consisting of data symbols, before transmission a specific signal form allocated to the data sequences is modulated on each of the data symbols of the K data sequences transmitted via a channel or K generally distinguishable channels, in order to generate the K transmission signals, which are all distorted by the one channel, or one of the K channels. In the receiver, continuous-valued provisional estimated values are calculated for some or all of the data symbols of the K input sequences according to a linear method, and a confidence level for the estimated values is calculated.

23 Claims, 4 Drawing Sheets

TRANSMISSION METHOD FOR SIMULTANEOUS SYNCHRONOUS OR ASYNCHRONOUS TRANSMISSION OF K DATA SEQUENCES CONSISTING OF DATA SYMBOLS

BACKGROUND OF THE INVENTION

The invention relates to a transmission method for the simultaneous synchronous or asynchronous transmission of K data sequences comprised of data symbols (input data sequences) via one channel or K generally distinguishable channels. Before the transmission, a specific signal form allocated to the data sequences is modulated on each of the data symbols of the K data sequences in order to generate the K transmission signals, which are all distorted by the one channel, or one of the K channels, and the reception signal is comprised of the additive superimposition of the K distorted transmission signals and of a possible additional interference signal.

From Verdu, S.: "Minimum Probability of Error for Asynchronous Gaussian Multiple Access Channels," IEEE Trans. IT 32 (1986, 85–96), a non-linear optimal detector for determining estimated values of the data symbols of the K input sequences is known, whose complexity increases exponentially with the number K. This detector is currently not implementable, due to its high complexity even for small values of K.

Further linear methods for calculating estimated values of the data symbols of the K input data sequences are known. Thus in Proakis, J. G.: "Digital Communications," New York, McGraw-Hill, 1989, signal-matched filtering and the RAKE receiver are described. In DE 41 21 356 A1, unbiased linear estimates of minimal variance are given.

In Ewerbring, M.; Gudmundson, B.; Larrson, G.; Teder. P: "CDMA with interference cancellation: A Technique for High Capacity Wireless Systems", Proc. Int. Conf. Commun., Geneva, 1993, 1901–1906, and Dent, P.; Gudmundson, B.; Ewerbring, M.: "CDMA-IC: A Novel Code Division Multiple Access Scheme Based on Interference Cancellation", Proc. Symp. Personal, Indoor and Mobile Radio Commun., Boston, 1992, 98–102, a method is stated in which a RAKE receiver based on the principle of signal-matched filtering is expanded to include a quantized feedback coupling. The confidence level, with the help of which the estimated values to be subtracted/eliminated are selected, is the energy or power of the portion of the kth transmission signal (k=1 . . . K) at the receiving end, or an estimate of this energy or power. The confidence level is thus suited to apply only to a differentiation between data symbols belonging to different input data sequences, and not to apply to a differentiation between data symbols of the same data sequence. The method is less suited if the K powers or energies at the receiving end are approximately equal.

SUMMARY OF THE INVENTION

An object of the invention is to improve a method of the type described above in comparison to known methods.

This object is solved according to the invention in that, at the receiver, continuous-valued provisional estimated values of some or all of the data symbols of the K input data sequences are calculated according to a linear method, and respective confidence levels for the estimated values are calculated.

Through the combination provided in the transmission method of the invention, of a linear estimation method with a quantized feedback coupling, the data to be fed back are selected using a specific confidence level to be determined for each estimated value. It is possible, depending on the confidence level chosen, either to increase the efficiency in comparison with previously known methods or to reduce computing expense. The solution according to the invention enables a higher degree of flexibility and a universal applicability in contrast to known methods.

The linear method for calculating the continuous-valued provisional estimated values at the receiver may thereby advantageously be a signal-matched filtering in which a matching either to the K specific signal forms or to the convolution products of the specific signal form and the associated impulse response of the channel is possible. The method may also advantageously be a decorrelating signal-matched filtering or a RAKE receiver, an unbiased linear estimation of minimal variance, or an optimal linear estimation.

In an advantageous construction of the subject matter of the invention it is further provided that, in a further procedural step, the estimated values and the confidence level are fed to a feedback coupling unit. It is thereby provided that a number $V$, $V_e(1,2,3,...)$, of provisional estimated values is selected, which according to the allocated confidence level are to be classified as more reliable than other provisional estimated values, and are used, directly or after modification, as final estimated values. If warranted, a reliability measure is calculated for at least one of the selected estimated values. It is further provided that the influence of the V selected estimated values on the received signal or on all or some of the previously unselected continuous-valued provisional estimated values is eliminated by subtraction, under the formation of new estimated values that are interpreted as the henceforth valid continuous-valued provisional estimated values, with which the entire process is again run through, until all of the final estimated values that were sought have been obtained.

Furthermore, it is advantageous that coded data symbols are provided and that estimated values and respective confidence levels are used during decoding, and that the modification of the estimated values corresponding to a set occurs in such a fashion that the estimated values are mapped onto a finite set, that the finite set is equal to the set of transmitted data symbols, and that the subtraction of the influence of the V selected estimated values occurs in the time or frequency domain, or by means of a Walsh-Hadamard transformation.

In the following the invention is more precisely specified by means of the exemplary embodiments represented in the drawings.

DESCRIPTION OF THE PREFERRED EMBODIMENTS

Figure 1:
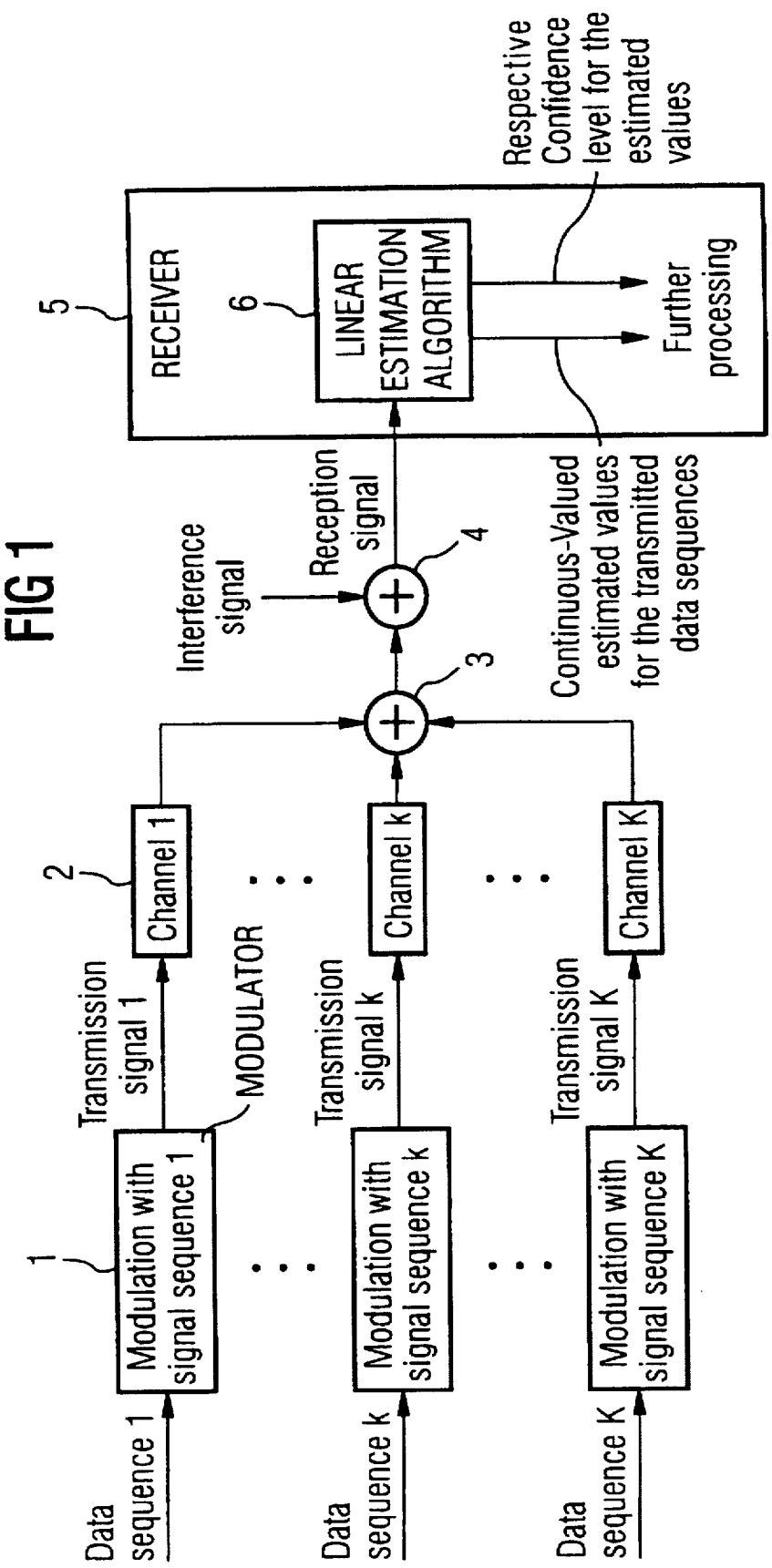
FIGS. 1 and 2 are transmission models in a block diagram.

FIG. 1 shows a transmission model having the data sequences (input data sequences) 1 . . . k . . . K. After a modulation with the signal sequence 1, k or K in the modulators 1, the respective output signals are sent as transmission signal 1, transmission signal k and transmission signal K to the channels 1, k and K, which are joined at the output side via a summation element 3. Via a further summation element 4, an interference signal is sent to the transmission path. The output signal of the summation element 4 is sent as a reception signal to the receiver 5. Its construction and function are more precisely specified below in connection with the corresponding receiver of the transmission model according to FIG. 2.

Figure 2:
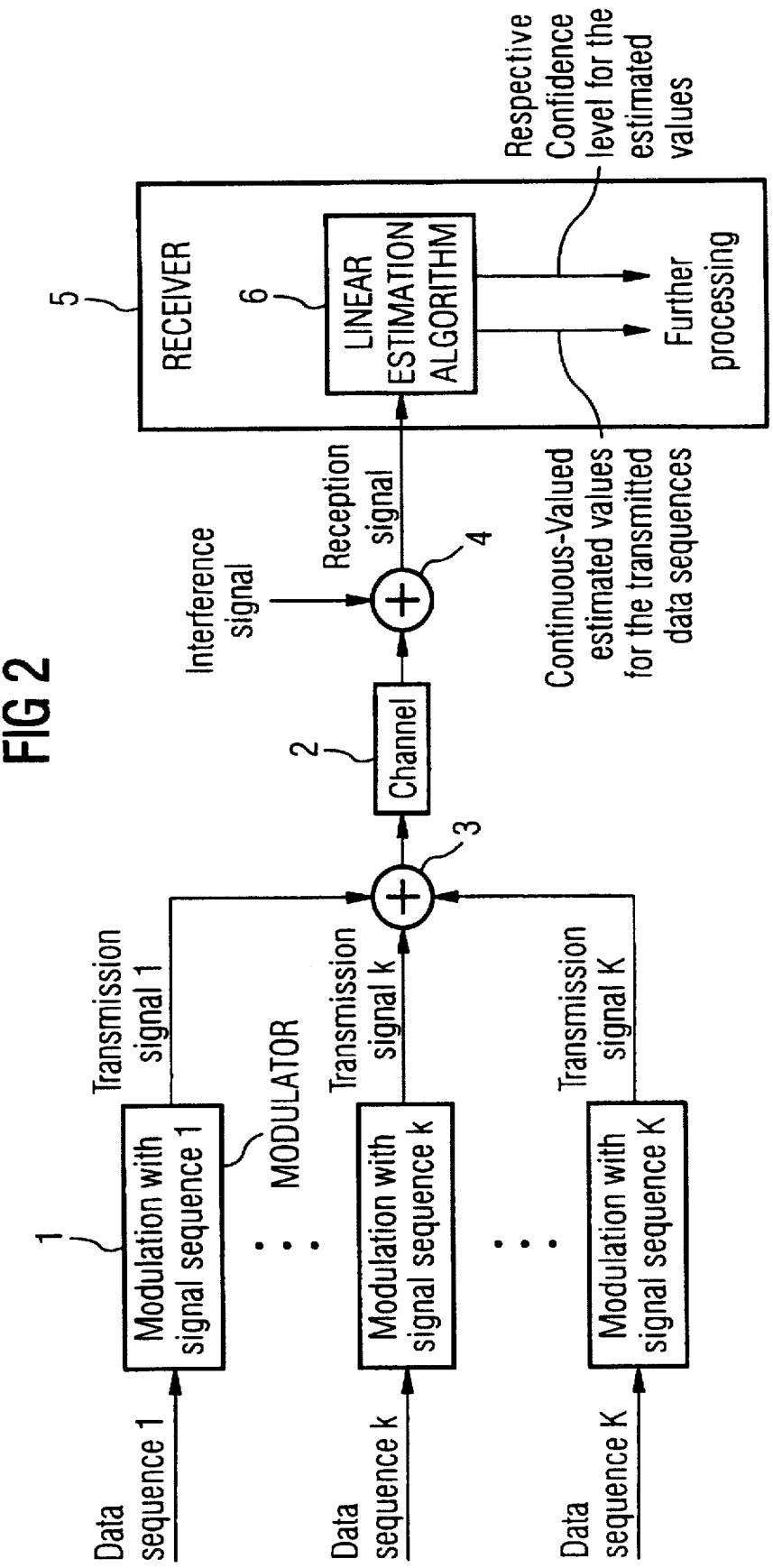

The transmission model according to FIG. 2 is distinguished from that according to FIG. 1 in that the transmission signals at the output of the modulators 1 are first joined in the summation element 3 and are then given together to the channel 2, after which a summation element 4 for the supply of an interference signal and a receiver 5 are connected.

In the receiver, continuous-valued provisional estimated values of some or all of the data symbols of the K input data sequences are calculated according to a linear method. In the receiver, which comprises a linear estimation algorithm (block 6), a respective confidence level or its estimation is calculated for each provisional estimated value, corresponding to a confidence criterion. The confidence level or the estimated value of the confidence level may be a function of the geometric locus of the continuous-valued provisional estimated values in the complex plane, or a function of the signal/noise relation or the variance of the continuous-valued provisional estimated values, as well as of the geometric locus of the continuous-valued provisional estimated values in the complex plane. The further processing of the estimated values and of the respective confidence level in a feedback coupling unit is specified below by means of FIG. 4.

Figure 3:
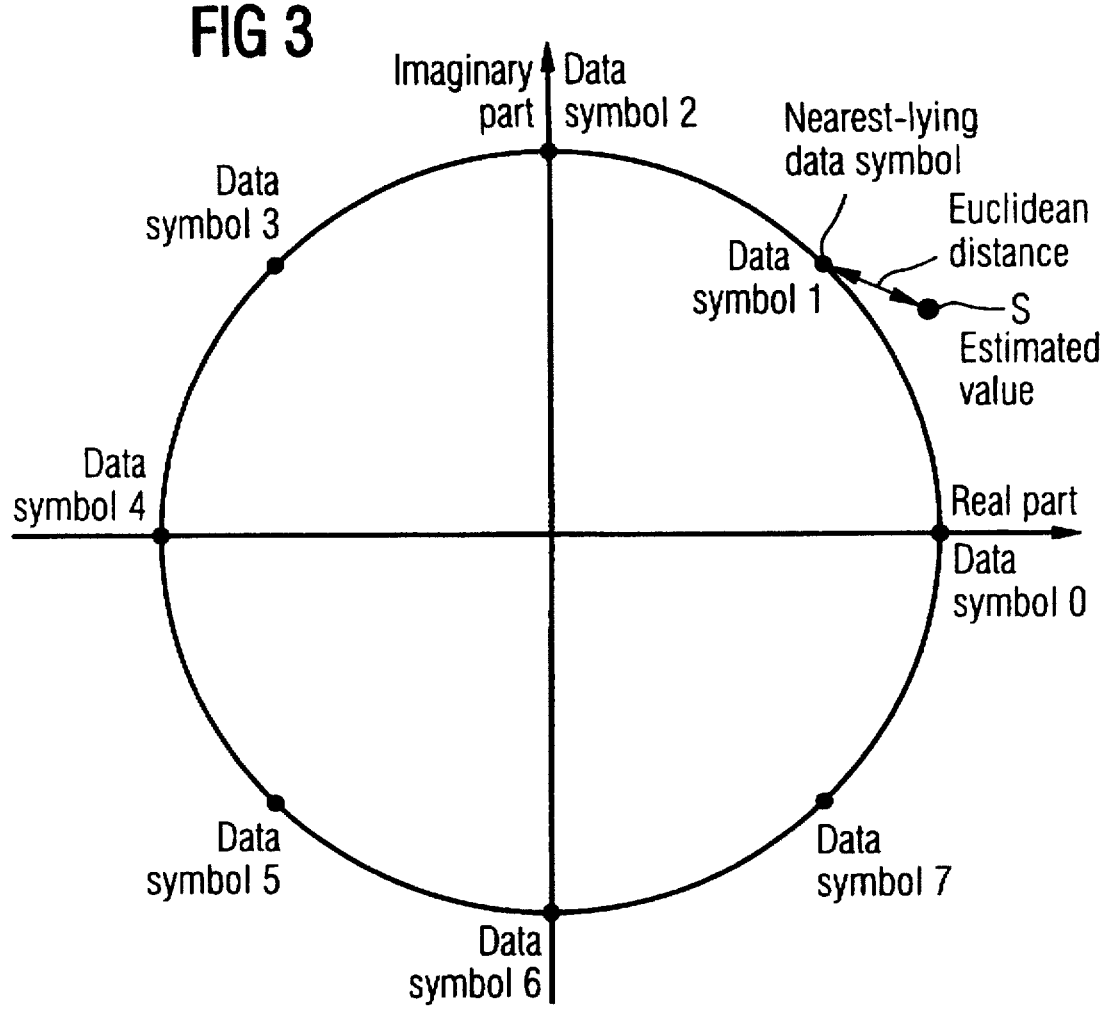
FIG. 3 shows data symbols and the Euclidean distance in the example of 8-PSK modulation.

FIG. 3 shows the data symbols and the Euclidean distance for the example of 8-PSK modulation. The data symbols 0 to 7 are entered in the complex plane with their real part (x-axis) and their imaginary part (y-axis). The data symbols 0 and 4 lie on the x-axis, the data symbols 2 and 6 lie on the y-axis, and the data symbols 1, 3, 5 and 7 lie on a circular arc inside one of the quadrants of the coordinate system. An estimated value is located at the point P outside the circular arc. Its distance to the data symbol lying nearest to it (data symbol 1 in the example) is the Euclidean distance.

Figure 4:
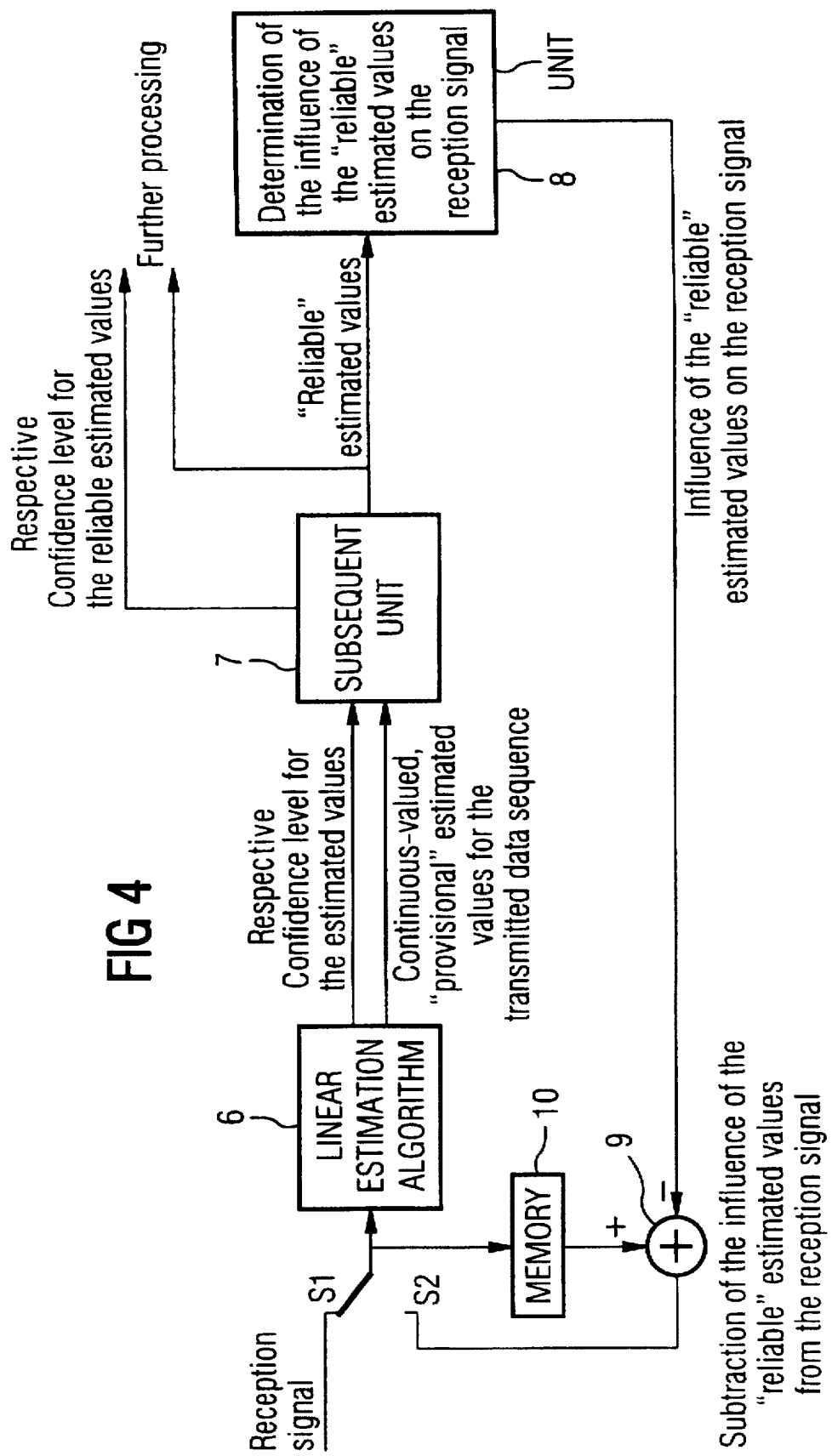
FIG. 4 shows a decision feedback coupling at the receiver.

FIG. 4 shows a decision feedback coupling unit in the receiver during block-serial transmission (switch position S1) and utilization of the pauses between transmissions for decision feedback coupling (switch position S2). The reception signal is sent via the switch S1 to the linear estimation algorithm 6 located in the receiver. Herein continuous-valued provisional estimated values for the transmitted data sequences and a respective confidence level for the estimated values are calculated. In a subsequent unit 7 a number of provisional estimated values are selected, which according to the allocated confidence level are to be classified as more reliable than other provisional estimated values. These selected estimated values are used as final estimated values directly or after a quantization. It is possible that for all or some of these selected estimated values a reliability level is calculated that may be equal or unequal to the allocated confidence level. The influence of the quantized selected estimated values on the reception signal or on all or some of the previously unselected continuous-valued provisional estimated values determined in the unit 8, is subtracted/eliminated (subtractor 9, whose second input is connected via a memory 10 with the input to the unit 6 and whose output is led to the switch in position S2). By this, estimated values are formed. If these new estimated values are interpreted as henceforth valid continuous-valued provisional estimated values with which the entire previously described process is again run through, all the final estimated values sought have been obtained and the process can be halted.

Although various minor changes and modifications might be proposed by those skilled in the art, it will be understood that our wish is to include within the claims of the patent warranted hereon all such changes and modifications as reasonably come within our contribution to the art.

We claim as our invention:

1. A transmission method for simultaneous synchronous or asynchronous transmission of K input data sequences each formed of data symbols via one channel or K generally distinguishable channels, comprising the steps of:

before transmission, modulating a specific signal form allocated to the data sequences on each of the data symbols of the K data sequences in order to generate K transmission signals, the K transmission signals all being distorted by said one channel or each of the K transmission signals being distorted by respective ones of said K channels;

forming a reception signal by additive superimposition of the K distorted transmission signals and of a possible additional interference signal;

at a receiver receiving the reception signal, calculating continuous-valued provisional estimated values of at least some of said data symbols of said K input data sequences according to a linear method, and calculating respective confidence levels for the provisional estimated values; and selecting a number V, where V<K, of provisional estimated values which according to respective confidence levels are classified as more reliable than other provisional estimated values and using the selected provisional values as final estimated values directly or after modification, and eliminating by subtraction an influence of the V selected provisional estimated values on the reception signal or on at least some of the previously unselected continuous-valued provisional estimated values.

2. The transmission method according to claim 1, wherein the linear method for calculating the continuous-valued provisional estimated values in the receiver is a signal-matched filtering, in which a matching to K specific signal forms or to convolution products of the specific signal form and an associated impulse response of the channel is performed.

3. The transmission method according to claim 1 wherein the linear method for calculating the continuous-valued provisional estimated values in the receiver is a decorrelating signal-matched filtering.

4. The transmission method according to claim 1 wherein the linear method for calculating the continuous-valued provisional estimated values in the receiver is a RAKE receiver.

5. The transmission method according to claim 1 wherein the linear method for calculating the continuous-valued provisional estimated values in the receiver is an unbiased linear estimation of minimal variance.

6. The transmission method according to claim 1 wherein the linear method for calculating the continuous-valued provisional estimated values in the receiver is an optimal linear estimation.

7. The transmission method according to claim 1 wherein each of the respective confidence levels corresponds to a respective reciprocal value of a respective symbol error probability during a quantization of the respective continuous-valued provisional estimated value.

8. The transmission method according to claim 1 wherein the confidence levels are a function of a geometric locus of the continuous-valued provisional estimated values in a complex plane and of a geometric locus of possibly transmitted data symbols in the complex plane.

9. The transmission method according to claim 1 wherein the confidence levels are a function of a signal/noise relationship or of a variance of the continuous-valued provisional estimated values as well as of a geometric locus of the continuous-valued estimated values in a complex plane and of a geometric locus of possibly transmitted data symbols.

10. The transmission method according to claim 1 wherein each of the confidence levels corresponds to a respective reciprocal value of a square of a Euclidean distance from a respective continuous-valued provisional estimated value to a respective possibly transmitted data symbol lying nearest to it in a complex plane, a nearest-lying data symbol being one having a smallest Euclidean distance to the respective continuous-valued provisional estimated value.

11. The transmission method according to claim 1 wherein each of the confidence levels corresponds to a respective reciprocal value of a quotient of: 1) a square of a Euclidean distance from a respective continuous-valued provisional estimated value to a possibly transmitted respective data symbol lying nearest to it in a complex plane; and 2) a signal/noise relation or reciprocal of a variance of the respective continuous-valued estimated value.

12. The transmission method according to claim 1 wherein each of the confidence levels corresponds to a respective reciprocal value of a respective quotient of: 1) a square of a Euclidean distance from a respective continuous-valued provisional estimated value to a respective possibly transmitted data symbol lying nearest to it in a complex plane; and 2) a sum of squares of Euclidean distances of this respective continuous-valued provisional estimated value to other respective possibly transmitted data symbols.

13. The transmission method according to claim 1 wherein each of the confidence levels corresponds to a respective reciprocal value of a respective quotient of: 1) a square of a Euclidean distance from a respective continuous-valued provisional estimated value to a respective possibly transmitted data symbol lying nearest to it in a complex plane and a product of a sum of squares of Euclidean distances of this respective continuous-valued provisional estimated value to other respective possibly transmitted data symbols; and 2) a signal/noise relation or a reciprocal of a variance of this respective continuous-valued provisional estimated value.

14. The transmission method according to claim 1 wherein in a further procedural step, the estimated values and the respective confidence levels are fed to a feedback coupling unit.

15. The transmission method according to claim 1 wherein coded data symbols are provided and estimated values and respective confidence levels are used during decoding.

16. The transmission method according to claim 1 wherein each set of K provisional estimated values is modified in such a way that the estimated values are mapped onto a finite set.

17. The transmission method according to claim 16 wherein the finite set is equal to a set of possibly transmitted data symbols.

18. The transmission method according to claim 1 wherein a subtraction of an influence of a number V of selected estimated values occurs in a time or frequency domain, or by a Walsh-Hadamard transformation.

19. The transmission method according to claim 1 wherein signal processing at the receiver occurs with digital signal processors or microprocessors.

20. The transmission method according to claim 1 wherein signal processing at the receiver proceeds in such a way that the reception signal is stored before further processing so that a further processing not occurring in real time can be carried out.

21. The transmission method according to claim 1 wherein signal processing at the receiver occurs such that estimated values and/or confidence levels and/or reliability levels are present in quantized form.

22. A transmission method for simultaneous synchronous or asynchronous transmission of K input data sequences each formed of data symbols via one channel or K generally distinguishable channels, comprising the steps of:

before transmission, modulating a specific signal form allocated to the data sequences on each of the data symbols of the K data sequences in order to generate K transmission signals, the K transmission signals all being distorted by said one channel or each of the K transmission signals being distorted by respective ones of said K channels;

forming a reception signal by additive superimposition of the K distorted transmission signals and of a possible additional interference signal;

at a receiver receiving the reception signal, calculating continuous-valued provisional estimated values of at least some of said data symbols of said K input data sequences according to a linear method, and calculating respective confidence levels for the estimated values; and the confidence levels corresponding to a respective reciprocal value of a respective quotient of: 1) a square of a Euclidean distance from a respective continuous-valued provisional estimated value to a respective possibly transmitted data symbol lying nearest to it in a complex plane; and 2) a sum of squares of Euclidean distances of this respective continuous-valued provisional estimated value to other respective possibly transmitted data symbols.

23. A transmission method for simultaneous synchronous or asynchronous transmission of K input data sequences each formed of data symbols via one channel or K generally distinguishable channels, comprising the steps of:

before transmission, modulating a specific signal form allocated to the data sequences on each of the data symbols of the K data sequences in order to generate K transmission signals, the K transmission signals all being distorted by said one channel or each of the K transmission signals being distorted by respective ones of said K channels;

forming a reception signal by additive superimposition of the K distorted transmission signals and of a possible additional interference signal;

at a receiver receiving the reception signal, calculating continuous-valued provisional estimated values of at least some of said data symbols of said K input data sequences according to a linear method, and calculating respective confidence levels for the estimated values; and the confidence levels correspond to a respective reciprocal value of a respective quotient of: 1) a square of a Euclidean distance from a respective continuous-valued provisional estimated value to a respective possibly transmitted data symbol lying nearest to it in a complex plane and a product of a sum of squares of Euclidean distances of this respective continuous-valued provisional estimated value to other respective possibly transmitted data symbols; and 2) a signal/ noise relation or a reciprocal of a variance of this respective continuous-valued provisional estimated value.

* * * * *